Jan. 21, 1958   F. MONACO   2,820,683
PLASTIC ARTICLE WITH RE-ENTRANT FORMATION
Filed July 22, 1954
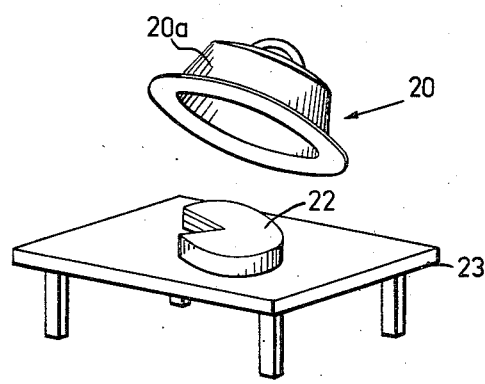
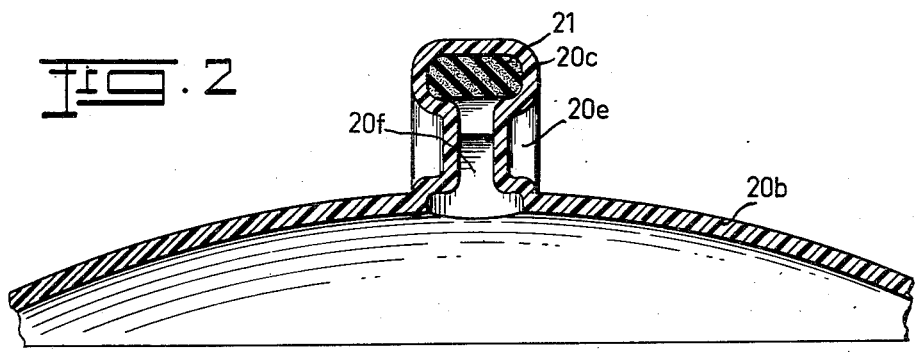
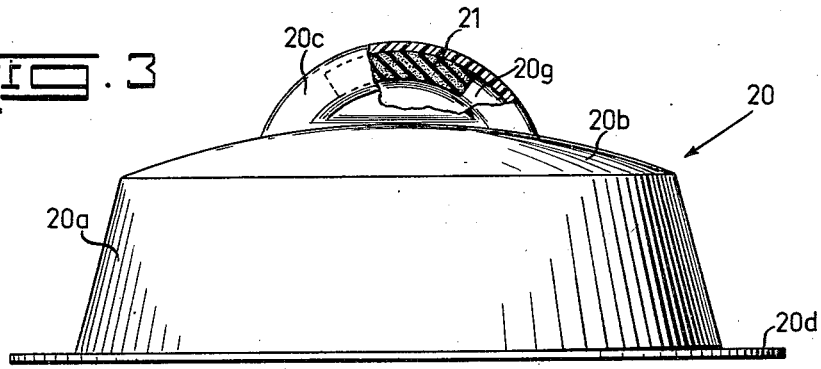
INVENTOR:
FOSTER MONACO
BY
AGENT United States Patent Office 2,820,683
Patented Jan. 21, 1958

2,820,683

PLASTIC ARTICLE WITH RE-ENTRANT FORMATION

Foster Monaco, Little Neck, N. Y.

Application July 22, 1954, Serial No. 444,985

5 Claims. (Cl. 312—31.1)

My present invention relates to plastic articles having a reentrant formation, more specifically to cake covers or the like provided with an integral handle portion.

This application is a continuation-in-part of my co-pending application Ser. No. 84,848, filed April 1, 1949, now Patent No. 2,688,156, granted September 7, 1954.

An object of my present invention is to provide an article of the class described in which the handle portion, made in one piece with the body of the article so as to avoid all problems of detachment and/or leakage, is particularly shaped and designed for easy gripping by the fingers of the user.

Another object of this invention is to provide an article of this character in which the handle portion is also adapted to serve as a receptacle for some accessory such as, for example, a sponge or the like used for moistening the atmosphere within the cover or container.

According to this invention, I provide a body of molded sheet material with an integral projecting portion having a pair of spaced-apart walls and a re-entrant formation in at least one of these walls, whereby a chamber is formed which widens or forms an enlarged channel near the periphery of the projection. The channel-forming part of the projection, by virtue of its increased thickness, represents a rib adapted to serve as a handle in lifting the article. The channel itself may conveniently serve as a means for retaining a moistened sponge acting as a humidifying agent.

Where the article is in the form of a cover having an upwardly curved top, the projection is preferably provided at the highest point of curvature.

The invention will be more fully described with reference to the accompanying drawing in which:

Fig. 1 is a perspective view of an article according to the invention, illustrating its use as a cake cover;

Fig. 2 is an enlarged sectional view of the central portion of the top of the cake cover, taken transversely to the handle portion; and Fig. 3 is a side-elevational view of the cover, taken at right angles to the view of Fig. 2 and on a somewhat smaller scale, with part of the handle portion broken away to expose the interior.

The cover embodying my invention, generally designated 20, comprises a frusto-conical base portion 20a, an upwardly curved top 20b, an arcuate handle portion 20c at the center of this top, and an annular flange 20d extending outwardly from the bottom of base 20a.

As best seen in Fig. 2, the handle portion 20c comprises two generally vertical, spaced-apart side walls provided with re-entrant formations or depressions 20e. These depressions, whose sectoral shape is apparent from Figs. 1 and 3, divide the space between the two side walls into a constricted neck 20f and a wider peripheral channel 20g. A moisture-absorbing strip 21 of spongy material is removably inserted into this channel as shown in Figs. 2 and 3.

As illustrated in Fig. 1, the article 20 may serve as a preferably transparent covering for a cake 22 placed on a table 23.

The article 20 with its flange 20d and handle 20c may be produced from a single sheet of plastic material by the process described and claimed in my above-identified patent.

The invention is, of course, susceptible to modifications and adaptations without departing from the spirit and scope of the appended claims.

I claim:

1. A cake cover comprising a hollow body of molded sheet material provided at its top with an integral projecting handle portion of arcuate configuration, said portion comprising a pair of at least roughly parallel walls defining between them a space communicating with the interior of said body, said walls being provided with opposite re-entrant formations dividing said space into a constricted neck adjacent said interior and a widened peripheral channel encircling said neck and opening at its ends directly into said interior.

2. A cake cover according to claim 1, wherein said formations are substantially sector-shaped.

3. A cake cover comprising a hollow body of molded sheet material, said body including a tubular base portion, an upwardly curved top portion integral with said base portion and an arcuate handle portion integral with and rising centrally from said top portion, said handle portion comprising a pair of spaced-apart upright side walls defining between them a space communicating with the interior of said body and closed toward the outside, said walls being provided with opposite, substantially sector-shaped re-entrant formations dividing said space into a constricted neck adjacent said interior and a widened peripheral channel encircling said neck and opening at its ends directly into said interior.

4. A cake cover according to claim 3, further including a strip of moisture-absorbing material removably inserted in said channel.

5. A cake cover according to claim 3, wherein said sheet material is transparent.

References Cited in the file of this patent

UNITED STATES PATENTS

| 1,331,470 | Luckett | Feb. 17, 1920 |
| 1,769,351 | Lauder | July 1, 1930 |
| 1,863,790 | Hermani | June 21, 1932 |
| 2,584,042 | Ober | Jan. 29, 1952 |

FOREIGN PATENTS

| 406,979 | France | Feb. 16, 1910 |